July 30, 1968 R. S. KLEIN 3,395,398

MEANS FOR SERVICING A PLURALITY OF DATA BUFFERS

Filed Dec. 16, 1965 2 Sheets-Sheet 1

INVENTOR.
RONALD S. KLEIN
BY
Carl V. Olson
Attorney

July 30, 1968 R. S. KLEIN 3,395,398

MEANS FOR SERVICING A PLURALITY OF DATA BUFFERS

Filed Dec. 16, 1965 2 Sheets-Sheet 2

| | | 1'' | 2'' | 3'' | 4'' |
|---|---|---|---|---|---|
| 1 | 1' | 00 00 00 | 00 00 01 | 00 00 10 | 00 00 11 |
| | 2' | 00 01 00 | 00 01 01 | 00 01 10 | 00 01 11 |
| | 3' | 00 10 00 | 00 10 01 | 00 10 10 | 00 10 11 |
| | 4' | 00 11 00 | 00 11 01 | 00 11 10 | 00 11 11 |
| 2 | 1' | 01 00 00 | 01 00 01 | 01 00 10 | 01 00 11 |
| | 2' | 01 01 00 | 01 01 01 | 01 01 10 | 01 01 11 |
| | 3' | 01 10 00 | 01 10 01 | 01 10 10 | 01 10 11 |
| | 4' | 01 11 00 | 01 11 01 | 01 11 10 | 01 11 11 |
| 3 | 1' | 10 00 00 | 10 00 01 | 10 00 10 | 10 00 11 |
| | 2' | 10 01 00 | 10 01 01 | 10 01 10 | 10 01 11 |
| | 3' | 10 10 00 | 10 10 01 | 10 10 10 | 10 10 11 |
| | 4' | 10 11 00 | 10 11 01 | 10 11 10 | 10 11 11 |
| 4 | 1' | 11 00 00 | 11 00 01 | 11 00 10 | 11 00 11 |
| | 2' | 11 01 00 | 11 01 01 | 11 01 10 | 11 01 11 |
| | 3' | 11 10 00 | 11 10 01 | 11 10 10 | 11 10 11 |
| | 4' | 11 11 00 | 11 11 01 | 11 11 10 | 11 11 11 |

INVENTOR.
RONALD S. KLEIN
BY
Carl V. Olson
Attorney 3,395,398
Patented July 30, 1968

3,395,398
MEANS FOR SERVICING A PLURALITY OF DATA BUFFERS

Ronald S. Klein, Cherry Hill, N.J., assignor to Radio Corporation of America, a corporation of Delaware Filed Dec. 16, 1965, Ser. No. 514,259
7 Claims. (Cl. 340—172.5)

ABSTRACT OF THE DISCLOSURE

A plurality of data line buffers each has a ready-for-service signal output connected to a control circuit for the respective buffer. Each control circuit has an output connected to enable the connection of the respective buffer to a computer processor. Inhibit means is provided which is responsive to a signal at the output of any one of the control circuits to disable the outputs of all other control circuits so that only one buffer at a time can be connected to the central processor. The inhibit means also directly provides the most-significant and less-significant numbers in the address of the buffer being serviced.

This invention relates to data processing systems, and particularly to means for one-at-a-time servicing of a plurality of data lines or buffers by a central processor.

A plurality of data lines can be serviced for the transfer of data to or form a central processor by means of a commutator switch which connects the processor to the data lines in succession. Servicing can be performed in a faster and more sophisticated way by means which connects the processor solely to the ones of the data lines which are ready for service. In a system making connection solely to data lines which are ready for service, it is necessary to include means for determining which of a plurality of ready lines should be serviced first. This is usually accomplished by assigning each data line a place in a priority hierarchy. The place of each data line in the priority hierarchy may be purely arbitrary. The need for priority hierarchy may be due solely to the need to decide which one of a plurality of ready data lines is to be serviced next. The central processor may be fast enough to perform one-at-a-time service of all the data lines when all are operating at their maximum data rates. In this case, the relative priority function of the priority means is not needed, and the operation of the priority means takes a small but significant amount of time.

It is an object of this invention to provide an improved arrangement for accomplishing the one-at-a-time servicing of a plurality of data lines or buffers, without wasting time on data lines or buffers which are not ready for service, and without wasting time in a selection based on a fixed relative priority.

It is another object of this invention to provide an improved arrangement for the one-at-a-time servicing of a plurality of data lines or buffers, the arrangement being one which automatically provides the address designation of the data line or buffer presently being serviced.

In accordance with an example of the invention, a plurality of data line buffers each has a ready-for-service signal output connected to a control circuit for the respective buffer. Each control circuit has an output connected to enable the connection of the respective buffer to a computer processor. Inhibit means is provided which is responsive to a signal at the output of any one of the control circuits to disable the outputs of all other control circuits, so that only one buffer at a time can be connected to the central processor.

According to a feature of the invention, each buffer and associated control circuit is identified by a respective address, and the buffers and associated control circuits are divided into most-significant groups determined by most-significant numbers in their addresses, and are divided into less-significant groups determined by less-significant numbers in their addresses. The inhibit means is organized so that an inhibit unit responsive to an output from any control circuit in a most-significant group disables the control circuits in all other most-significant groups. Further, the inhibit means includes an inhibit unit responsive to an output from any control circuit in a less-significant group to disable the control circuits in all other equally less-significant groups. The inhibit units thus directly provide the most-significant and less-significant numbers in the address of the buffer being serviced.

Figure 1:
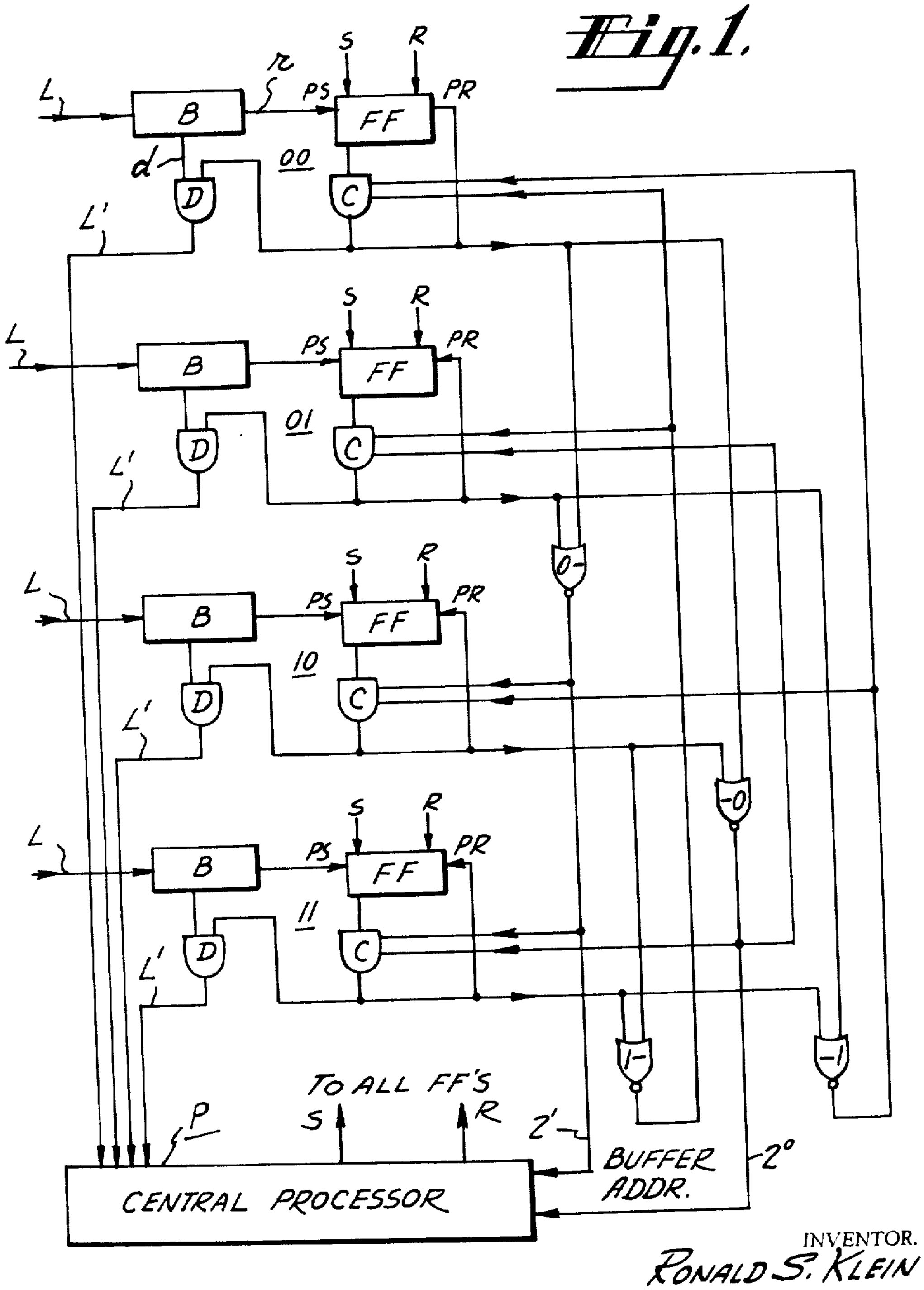
FIG. 1 is a block diagram of a system according to the invention for the one-at-a-time servicing of four buffers by a central processor.

Referring in greater detail to FIG. 1, there are shown four data lines L connected to four respective buffers B. A respective flip-flop FF is associated with each buffer B. Each buffer B has a ready-for-service output *r* connected to a prime set input PS of the respective flip-flop FF. Each flip-flop FF also has a set input S, a reset input R and a prime reset input PR. Each flip-flop FF represents any suitable conventional bistable circuit which can be switched to a set state by the simultaneous presence of signals on its set S and prime set PS inputs, and which can be reset by the simultaneous presence of signals on its reset R and prime reset PR inputs.

The "1" output of each flip-flop FF is connected to the input of an "and" control gate C. The output of gate C is connected to an enabling input of a data gate D. When data gate D is enabled by an output signal from gate C, data is passed from buffer B over line *d*, through gate D and through line L′ to a central processor P.

The central processor P has a set output S and a reset output R which are connected over leads (not shown) to respective set inputs S and reset inputs R of all of the flip-flops FF. The output of each control gate C is connected to the prime reset input PR of the respective flip-flop FF. The flip-flop FF, control gate C, data gate D and their connections are considered to constitute a control circuit for controlling the data output of the respective buffer B. It will be understood that each data gate D may also, or alternatively, provide a controllable path for data flowing from the central processor P to the respective buffer B.

The four buffers B and associated control circuits shown by way of example are identified by binary addresses 00, 01, 10 and 11. The first digit of each address is a most-significant digit, and the second digit of each address is a less-significant digit. The four buffers and associated control circuits are divided into two most-significant groups determined by the most-significant digit in their addresses. That is, the buffers and control circuits 00 and 01 constitute one most-significant group, and buffers and control circuits 10 and 11 constitute a second most-significant group. The four buffers and control circuits are also divided into less-significant groups determined by the less-significant digits in their addresses. That is, buffers and control circuits 00 and 10 constitute one less-significant group and buffers 01 and 11 constitute a second less-significant group.

A first inhibit unit is constituted by an inverting "or" gate 0– and an inverting "or" gate 1–. The gate 0– has inputs connected to the outputs of control units 00 and 01, and has outputs connected in inhibiting fashion to the control gate C in control units 10 and 11. Gate 1– is connected in the reverse fashion so that it has inputs connected to the outputs of control units 10 and 11, and has outputs connected in inhibiting fashion to control units 00 and 01. The inhibit unit constituted by gates 0– and 1–are connected so that an output from either one of control units 00 and 01 results in the application of an inhibiting signal to both control units 10 and 11; and an output from either one of control units 10 and 11 results in the application of an inhibiting signal to both control units 00 and 01. Stated another way, the inhibit unit 0– and 1– is responsive to an output from any control circuit in a most-significant group to disable the control circuits in the other most-significant group, or, more broadly, in all other most-significant groups.

A second inhibit unit is constituted by inverting "or" gates –0 and –1. The gates –0 and –1 are connected between less-significant groups of control circuits. That is, gate –0 is connected to receive an output from control unit 00 or 10 and to supply an inhibiting or disabling signal to control units 01 and 11. Gate –1 does the reverse. That is, gate –1 responds to an output from control unit 01 or 11 to supply an inhibiting or disabling signal to control units 00 and 10. Stated another way, the inhibit unit constituted by gates –0 and –1 are responsive to an output from any control circuit in a less-significant group to disable the control circuits in the other, or all other, equally less-significant groups.

The operation of the system will now be described assuming, by way of example, that buffers 01 and 10 are ready for service and are supplying ready-for-service signals to the prime set inputs PS of respective flip-flops FF. At this time the central processor P supplies a set pulse S to the set inputs S of all four flip-flops FF. Since flip-flops 01 and 10 are the only flip-flops with prime set inputs, they are the only flip-flops which are set by the set pulse S. The set or "1" outputs of the 01 and 10 flip-flops start passing through the respective control gates C. However, the output of gate C in control unit 01 is directed through gate 0– as an inhibiting signal to the control gate C in control unit 10. At the same time, the output of gate C in control unit 10 is applied through gate 1– as an inhibiting signal to gate C in control unit 01. The cross-coupled control unit 01 and 10 cannot both provide enabling outputs to their respective data gates D. One or the other of the control unit 01 and 10 will dominate and inhibit the other. The control circuit which gains ascendancy will do so very rapidly, as the result of a slightly more rapid operation due to the instantaneous presence of random noise or due to more favorable lengths of wire or more favorable distributed impedances. The control circuit which achieves dominance does so very quickly compared with the time required in a system in which a control circuit is selected on the basis of its place in a priority hierarchy.

It is assumed that the control unit 01 gains dominance over control unit 10. The control gate C of control unit 01 then supplies an enabling signal to the data gate D permitting data to flow from the corresponding buffer B to the central processor P. At the same time, the output from gate C of control unit 01 is supplied in inhibiting fashion through gate 0– to control units 10 and 11, and through gate –1 to control unit 01. The output of control unit 01 is also connected internally to the prime reset input PR of the respective flip-flop FF.

After the central processor P has utilized the data supplied from the buffer B associated with control unit 01, the processor P supplies a reset pulse to the reset inputs R of all flip-flops FF. The flip-flop FF in control unit 01 is the only flip-flop having a signal on its prime reset input PR, and therefore it is the only flip-flop which is reset by the processor reset pulse. Thereafter, the central processor P again supplies a set pulse to the set inputs S of all flip-flops. In the absence of intervening ready-for-service signals from buffers 00 and 11, the selection process then results in the selection of buffer and control circuit 10. Buffer and control circuit 01 is not selected again because it has just supplied data to the processor and is not yet ready for repeated service and has not supplied a ready-for-service signal to the prime set input PS of the corresponding flip-flop FF.

From the foregoing it can be seen that the selection system is one which conditions one buffer for service by sensing only the buffers supplying a ready-for-service signal, and by selecting one of the buffers which are ready for service on a purely arbitrary basis. The control circuit which achieves dominance does so by inhibiting all other control circuits.

Following the assumption that the control unit 01 achieved dominance and selected its corresponding buffer for service by the processor P, the output of gate C in control circuit 01 appears at the output of gate 0– on the lead $2^1$ as the most-significant digit in the address of the 01 buffer. That is, a high input to gate 0– is inverted at the output lead $2^1$ to represent the "0" which is the first digit in the address 01.

At the same time, the output of control gate C of control circuit 01 is not applied to the input of gate –0. Since the control gate C in control unit 00 and 10 is also not supplying inputs to gate –0, the absence of input signals to gate –0 results in a "1" signal at its inverted output lead designated $2^0$. The presence of a signal on the lead $2^0$ indicates that the less-significant digit of the address of the buffer and control unit 01 is a "1." In this way, the outputs $2^1$ and $2^0$ from the gates 0- and -0 automatically provide the address of the buffer being serviced, for use by the central processor P.

While the invention has been illustrated as applied to the one-at-a-time servicing of only four buffers, it will be understood that the invention is even more useful in the servicing of a considerably larger number of buffers. For example, if it is desired to service eight buffers, the buffers will have addresses from binary number 000 to binary number 111. In this case three inhibit units may be employed, one inhibit unit for each of the three digits in the addresses.

Figures 2, 3:
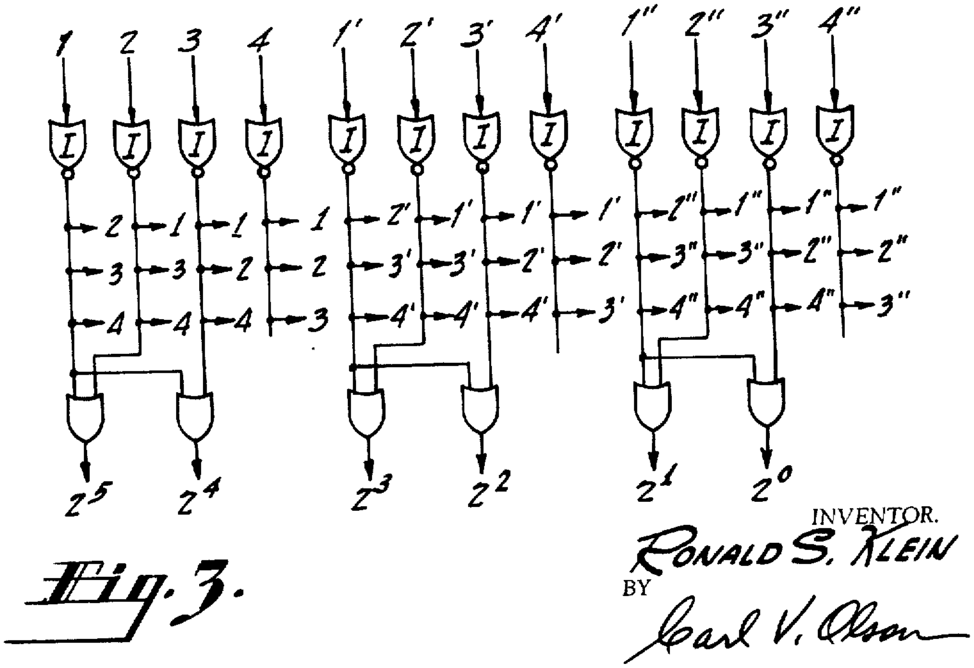
FIG. 2 is a chart showing a grouping by addresses of sixty-four buffers.
FIG. 3 is a diagram showing an arrangement of inhibit gates for the system including sixty-four buffers.

The system may further be applied, for example, to the selection of any one of sixty-four buffers. In this case, the sixty-four buffers, having addresses as shown in FIG. 2, are divided into four most-significant groups 1, 2, 3 and 4, four less-significant groups 1′, 2′, 3′ and 4′, and four least-significant groups 1″, 2″, 3″ and 4″. The chart of FIG. 2 shows the addresses $2^5\ 2^4\ 2^3\ 2^2\ 2^1\ 2^0$ of the sixty-four buffers and their three-dimensional division into groups.

FIG. 3 shows inverting inhibit gates I which receive outputs from control circuits of all buffers in a designated group, and supply inhibit signals to control circuits of other designated groups. For example, the first inhibit gate I receives outputs from all control circuits in group 1 and supplies inhibit signals to all control circuits in groups 2, 3 and 4. One of the sixty-four control circuits achieves dominance by inhibiting all the other sixty-three control circuits. Outputs of selected ones of the inhibit gates I are also connected to six gates directly providing the six-digit address $2^5\ 2^4\ 2^3\ 2^2\ 2^1\ 2^0$ of the one buffer selected for service.

What is claimed is:

1. Means for the one-at-a-time servicing of a plurality of buffers each having a ready-for-service signal output and a data line, comprising:

a control circuit for each buffer, each control circuit having an input coupled to receive a ready-for-service signal from the respective buffer, and having an output, means coupling the output of each control circuit to enable the data line of the respective buffer, inhibit means responsive to a signal at the output of each one of said control circuits to disable the outputs of all other control circuits, whereby the data line of only one buffer can be enabled at a time, and means to condition all of said control circuits at a given same time to respond to ready-for-service signals from their respective buffers and to thereupon start to generate respective output signals, whereby the quickest acting one of the control circuits inhibits the outputs of the other control circuit before it is itself inhibited.

2. The combination as defined in claim 1 wherein each control circuit includes a flip-flop capable of being set on the simultaneous presence of a ready-for-service signal and a set signal, and means to apply a set signal to the flip-flops in all of said control circuits to initiate the selection of a dominating control circuit which will enable the data line of a respective buffer.

3. The combination as defined in claim 2 wherein each of said flip-flops is also capable of being reset on the simultaneous presence of an output from the respective control circuit and a reset signal, and means to apply a reset signal to the flip-flops in all of said control circuits to reset the dominating control circuit prior to the application of a following set signal.

4. The combination as defined in claim 3 wherein each buffer and associated control circuit is identified by a respective address, wherein the buffers and associated control circuits are divided into most-significant groups determined by most-significant numbers in their addresses and are divided into less-significant groups determined by less-significant numbers in their addresses, and wherein said inhibit means includes:

an inhibit unit responsive to an output from any control circuit in a most-significant group to disable the control circuits in all other most-significant groups, an inhibit unit responsive to an output from any control circuit in a less-significant group to disable the control circuits in all other equally less-significant groups, and means responsive to the outputs of the inhibit units to provide the most-significant and less-significant numbers in the address of the buffer being serviced.

5. The combination as defined in claim 1 wherein each buffer and associated control circuit is identified by a respective address, wherein the buffers and associated control circuits are divided into most-significant groups determined by most-significant numbers in their addresses and are divided into less-significant groups determined by less-significant numbers in their addresses, and wherein said inhibit means includes:

an inhibit unit responsive to an output from any control circuit in a most-significant group to disable the control circuits in all other most-significant groups, an inhibit unit responsive to an output from any control circuit in a less significant group to disable the control circuits in all other equally less-significant groups, and means responsive to the outputs of the inhibit units to provide the most-significant and less-significant numbers in the address of the buffer being serviced.

6. The combination as defined in claim 1 wherein each buffer and associated control circuit is identified by a respective binary address, wherein the buffers and associated control circuits are divided into two most-significant groups determined by the most-significant binary digits in their addresses and are divided into two less-significant groups determined by the less-significant binary digits in their addresses, and wherein said inhibit means includes:

an inhibit unit responsive to an output from any control circuit in a most-significant group to disable the control circuits in the other most-significant group, an inhibit unit responsive to an output from any control circuit in a less-significant group to disable the control circuits in the other less-significant group, and means responsive to the outputs of the inhibit units to provide the most-significant and less-significant digits in the address of the buffer being serviced.

7. The combination as defined in claim 1 wherein each buffer and associated control circuit is identified by a respective binary address, wherein the buffers and associated control circuits are divided into four most-significant groups determined by the two most-significant binary digits in their addresses, are divided into four less-significant groups determined by the two less-significant binary digits in their addresses, and are divided into four least-significant groups determined by the two least-significant digits in their addresses, and wherein said inhibit means includes:

an inhibit unit responsive to an output from any control circuit in a most-significant group to disable all control circuits in the other three most-significant groups, an inhibit unit responsive to an output from any control circuit in a less-significant group to disable all control circuits in the other three less-significant groups, an inhibit unit responsive to an output from any control circuit in a least-significant group to disable all control circuits in the other three least-significant groups, and means responsive to the outputs of the inhibit units to provide the address of the buffer being serviced.

References Cited

UNITED STATES PATENTS

| | | | |
|---|---|---|---|
| 3,239,819 | 3/1966 | Masters | 340—172.5 |
| 3,293,612 | 12/1966 | Ling | 340—172.5 |
| 3,303,475 | 2/1967 | Hellerman et al. | 340—172.5 |
| 3,309,672 | 3/1967 | Brun et al. | 340—172.5 |
| 3,334,334 | 8/1967 | Halpin | 340—172.5 |
| 3,351,911 | 11/1967 | Harple et al. | 340—172.5 |
| 3,233,112 | 2/1966 | Baldwin | 340—172.5 X |
| 3,241,124 | 3/1966 | Newhouse | 340—172.5 |

PAUL J. HENON, *Primary Examiner.*